No. 719,457. PATENTED FEB. 3, 1903.
J. W. GARLAND & A. P. AIKEN.
LIFTING JACK.
APPLICATION FILED AUG. 9, 1901.
NO MODEL. 5 SHEETS—SHEET 1.
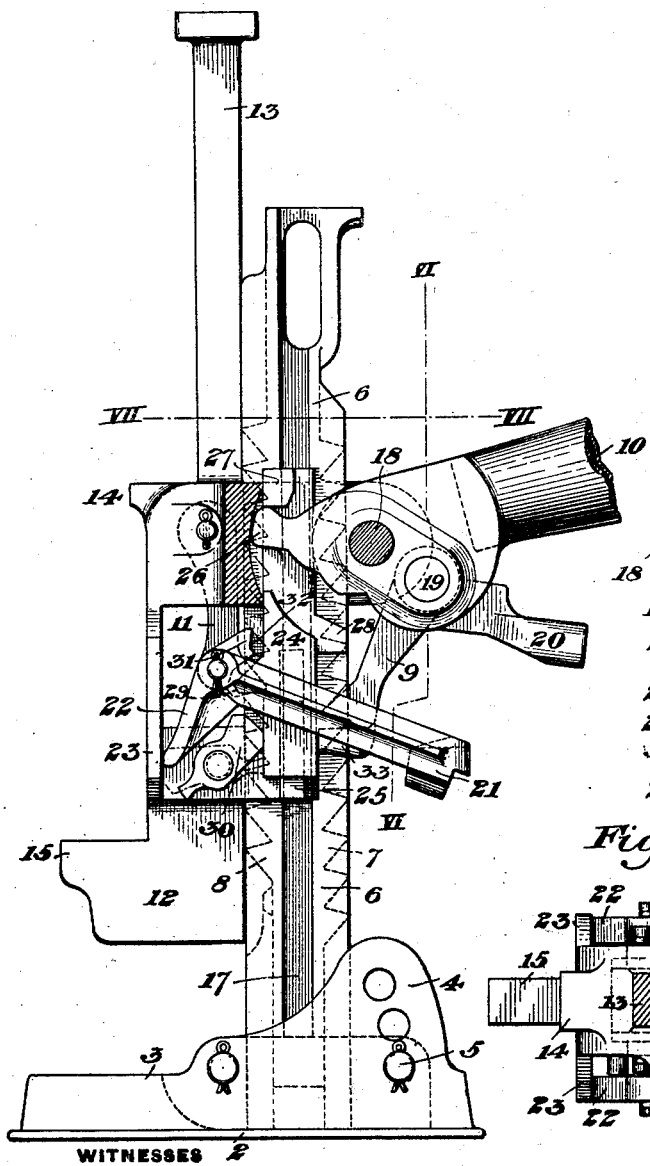
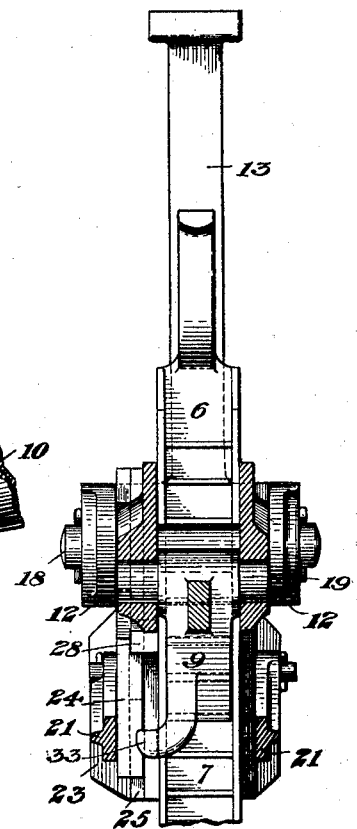
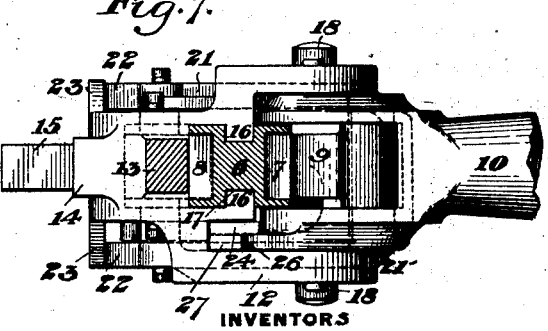
WITNESSES
INVENTORS No. 719,457.   
PATENTED FEB. 3, 1903.

J. W. GARLAND & A. P. AIKEN.

LIFTING JACK.

APPLICATION FILED AUG. 9, 1901.

NO MODEL.

5 SHEETS—SHEET 2.

WITNESSES

INVENTORS

No. 719,457. PATENTED FEB. 3, 1903.
J. W. GARLAND & A. P. AIKEN.
LIFTING JACK.
APPLICATION FILED AUG. 9, 1901.
NO MODEL. 5 SHEETS—SHEET 4.

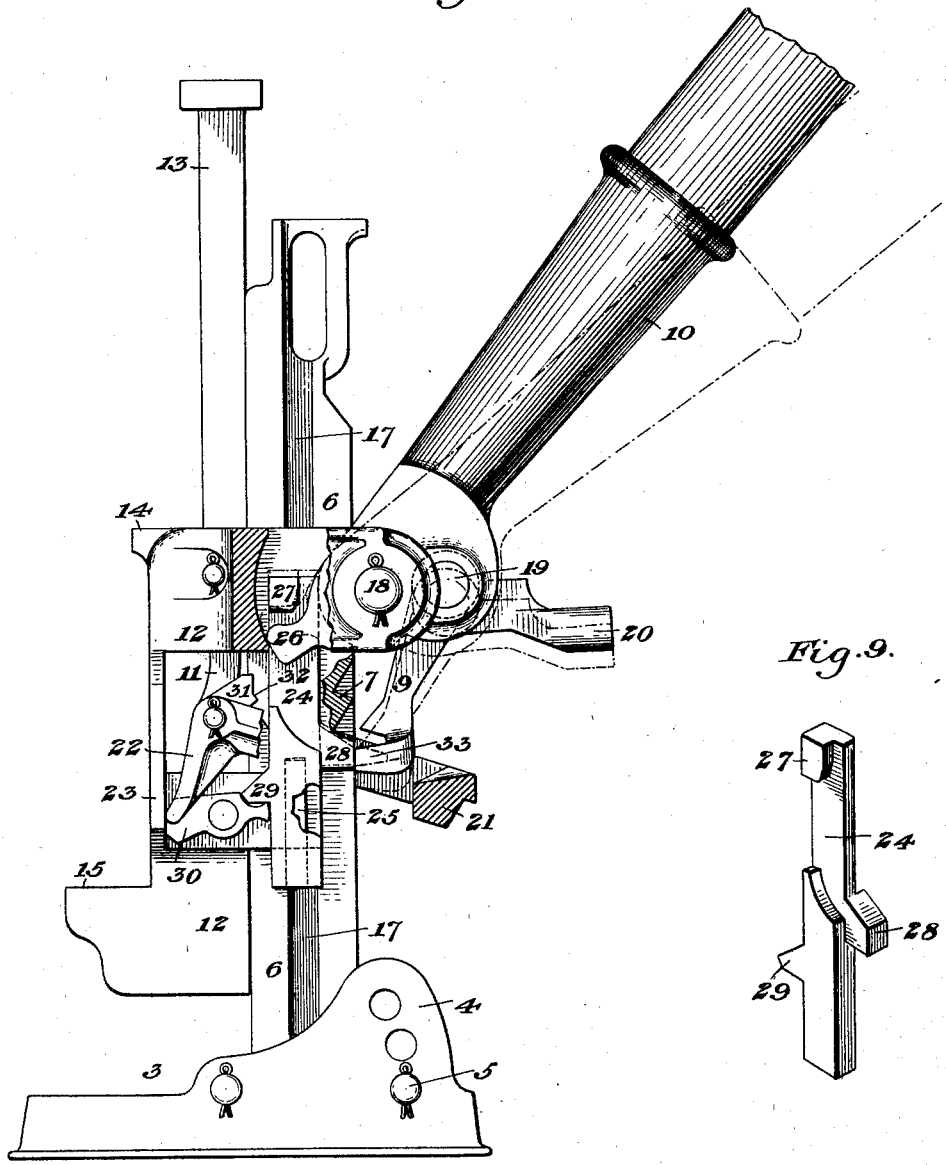

UNITED STATES PATENT OFFICE.

JOHN W. GARLAND, OF PITTSBURG, AND ALBION P. AIKEN, OF PORT PERRY, PENNSYLVANIA, ASSIGNORS TO SAID GARLAND.

LIFTING-JACK.

SPECIFICATION forming part of Letters Patent No. 719,457, dated February 3, 1903.

Application filed August 9, 1901. Serial No. 71,481. (No model.)

*To all whom it may concern:*

Figure 8:
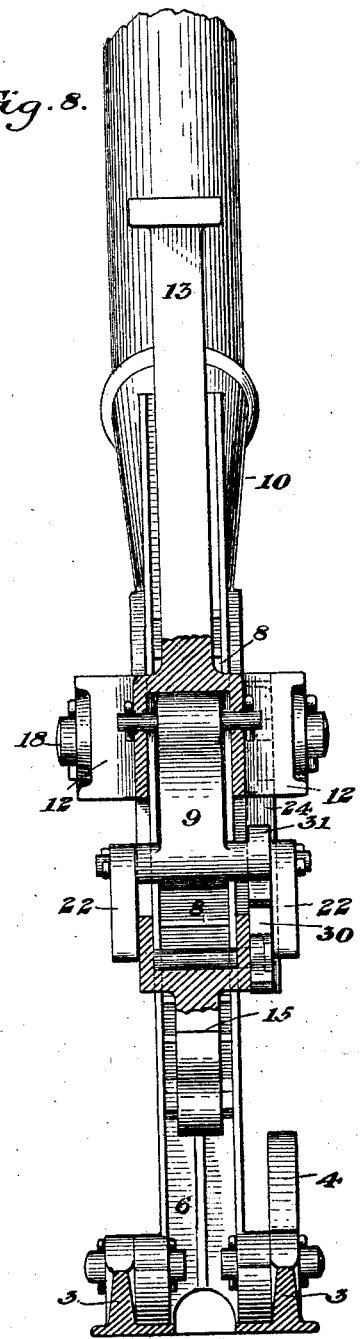
Figure 2:
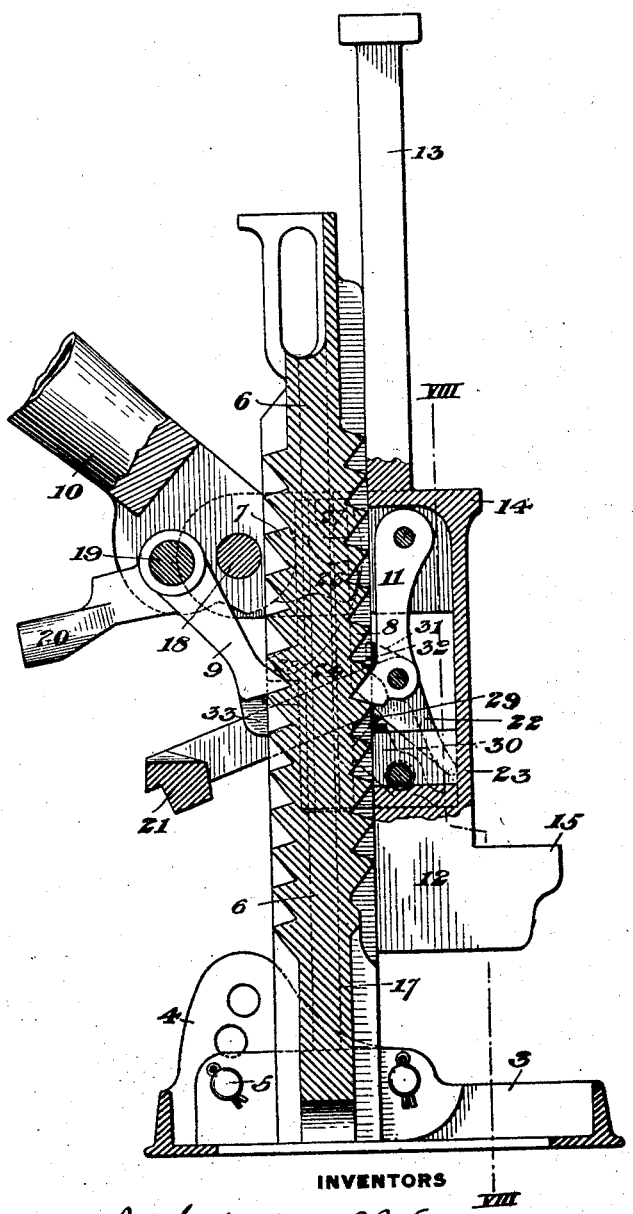
Figure 3:
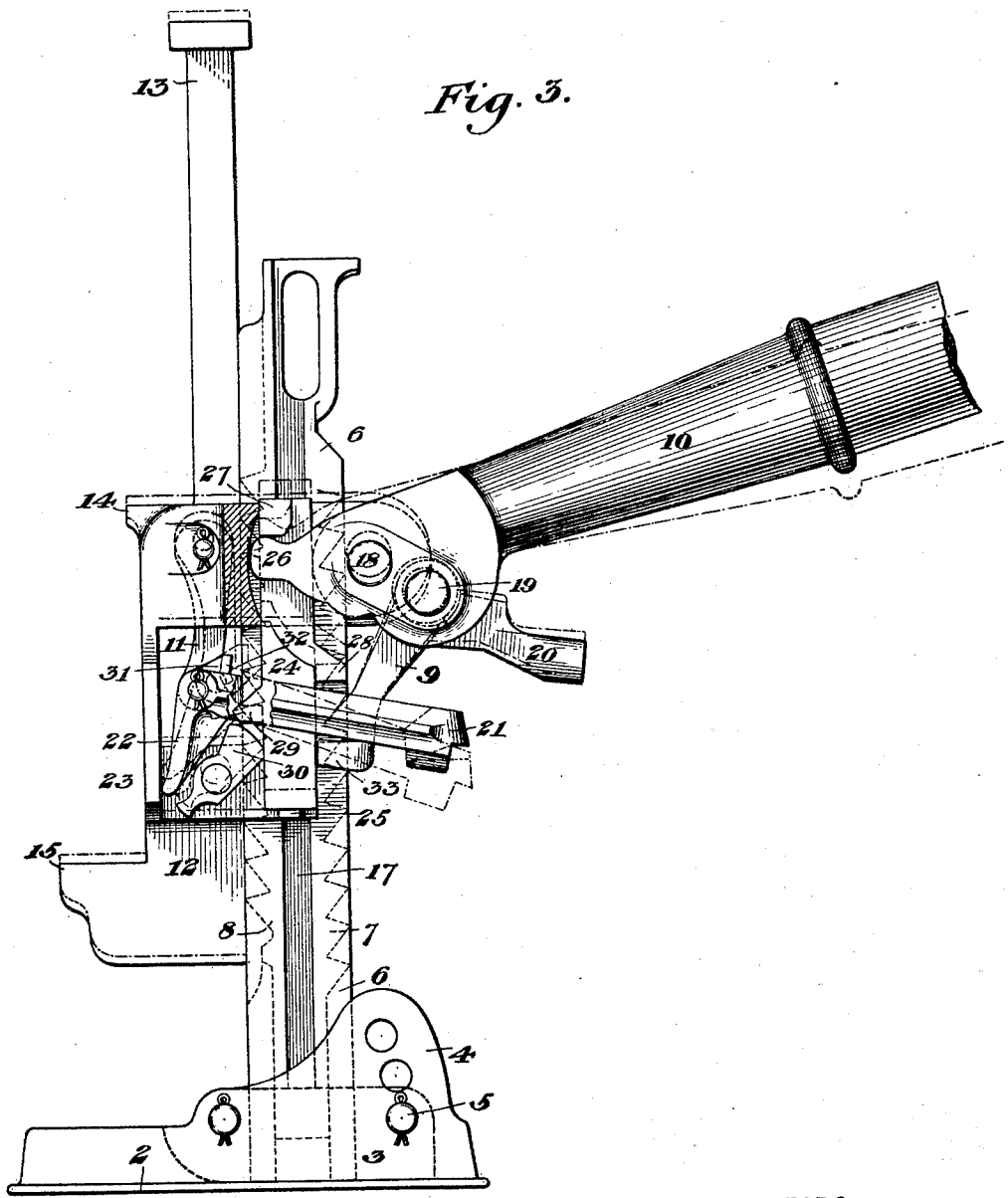
Figure 4:
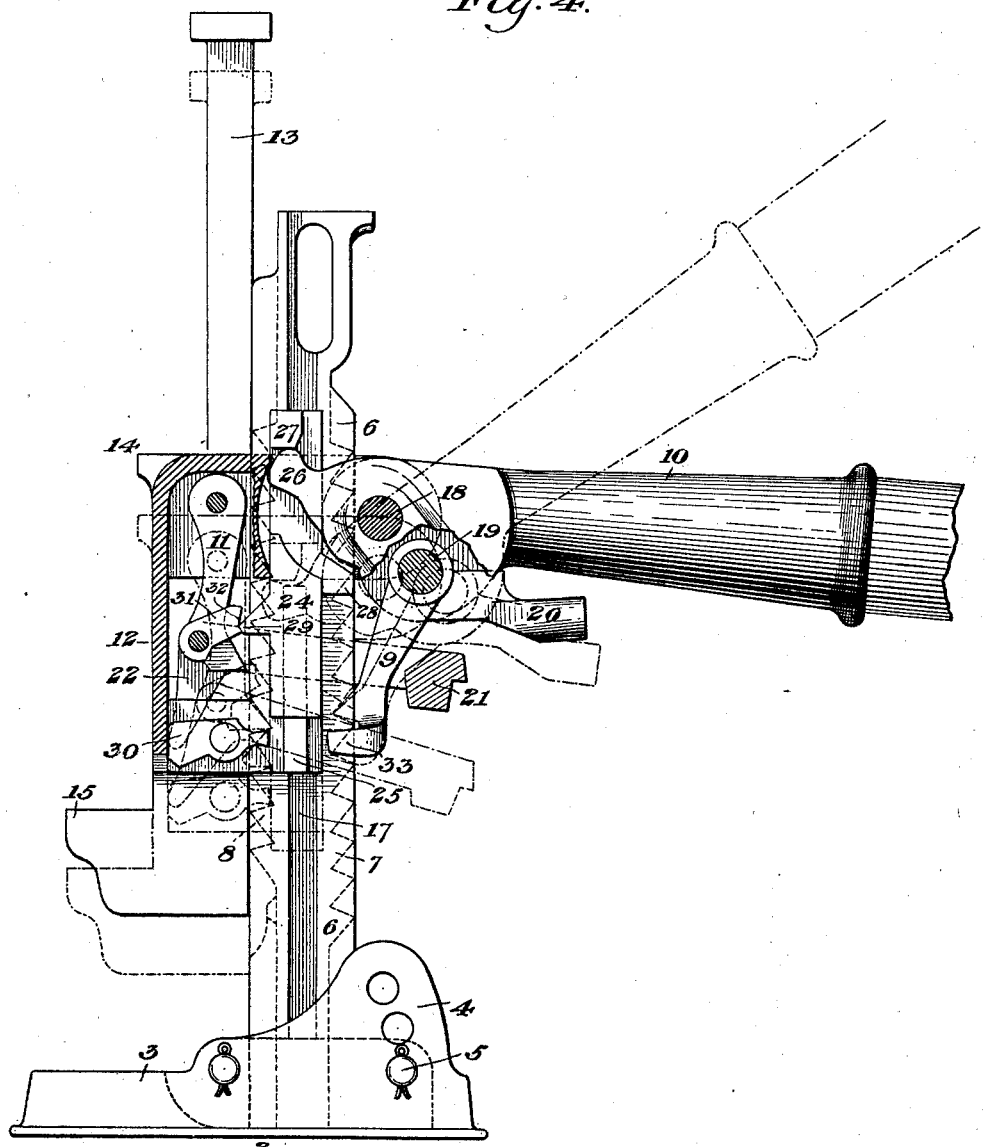

Be it known that we, JOHN W. GARLAND, of Pittsburg, and ALBION P. AIKEN, of Port Perry, Allegheny county, Pennsylvania, have invented a new and useful Lifting-Jack, of which the following is a full, clear, and exact description, reference being had to the accompanying drawings, forming part of this specification, in which—
Figure 1 is a side elevation, partly broken away, of my improved jack. Fig. 2 is a central vertical section of the same with the lever-pawl shifted one tooth higher than that shown in Fig. 1. Fig. 3 is a view similar to that of Fig. 1, showing in full lines an intermediate position during the lowering of the lever and in dotted lines the positions of the parts at the end of this movement, being the same as the position shown in Fig. 1, but with the lifting-bar moved one tooth higher. Fig. 4 is a view similar to Fig. 1, showing in full lines the parts in their normal positions when beginning to lower the jack and in dotted lines the positions of the parts when the lever has been lifted to its upper limit. Fig. 5 is a side elevation, partly broken away, showing in full lines an intermediate position during the lowering of the jack and in dotted lines the position of the lever and its pawl near the end of its lowering operation. Fig. 6 is a partial vertical section on the line VI VI of Fig. 1 looking toward the left. Fig. 7 is a horizontal section on the line VII VII of Fig. 1. Fig. 8 is a vertical section on the inner edge of the line VIII VIII of Fig. 2, and Fig. 9 is a perspective view of the tripping-slide which acts upon the pawls.

Our invention relates to lifting-jacks of the type wherein a stationary toothed bar is provided having teeth on both sides, and a lifting-bar is secured to the frame, which travels up and down the stationary toothed bar, and more specially to the type of jacks set forth in United States Patent No. 480,685, dated August 9, 1892, No. 490,221, dated January 17, 1893, and No. 509,565, dated November 28, 1893, granted to Albion P. Aiken; and its object is to improve the action of such jacks by providing latch mechanism which may be shifted so that on rocking the lever the lifting-bar will travel either up or down one tooth at a time, as desired, and, further, to improve certain details of the jack, hereinafter referred to.

In the drawings, 2 represents a base having side plates 3 3, one of which has an extension 4, provided with holes to receive a holding-pin 5. The toothed bar 6 is pivoted at its lower end to the base and may be rocked into different positions, in which it may be held by pin 5. The bar is provided with teeth 7 and 8 on its opposite sides, with which respectively engage a pawl 9 on the lifting-lever 10 and a pawl 11, pivoted in the movable frame 12. The lifting-bar 13 is secured to and movable with the frame, and the frame is preferably provided with projections 14 and 15, which may be engaged with the parts being lifted, where such part is too low to be engaged by the lifting-bar proper.

The traveling frame 12 is of general U shape and is provided with inwardly-projecting ribs 16, which engage corresponding recesses 17 at the sides of the toothed bar. The lifting-lever 10 is pivoted to a pin 18 in the traveling frame, and the pawl 9 is pivoted to a pin 19 upon this lever, the pawl having a weighted lever 20, which acts by gravity to force the pawl inwardly against inclined teeth. The depending pawl 11 is also normally forced inwardly by a U-shaped weighted lever 21, which surrounds the toothed bar and is provided with arms 22, which bear against side extensions 23 on the frame 12.

The parts above described are common to the constructions shown in the prior patents granted to Albion P. Aiken, with the exception of the device for holding the jack in its tilted position, and we will now describe the new device for enabling step-by-step movement in either direction to be imparted to the jack. This device consists principally of a tripping slide-plate 24, which is shown in Fig. 9. This slide fits between one arm of the U-shaped lever 21 and a part of the frame at its upper end, its position being shown in Figs. 6 and 7. It is provided on its inner face with a vertical keyway, (shown in Fig. 5,) with which engages a guide 25, projecting from the portion 12 of the frame. On its outer face the slide is cut away at its upper portion to receive a lifting-finger 26 on the lever, which engages a small lug 27 at the upper end of the slide. The slide is provided on one side with a projection 28, arranged to engage the lever-pawl, and on the opposite side with a projection 20, which engages the pawl on the frame in certain positions of the parts, as shown in Fig. 4. In order to adjust the slide vertically and move it from its ordinary position in Figs. 1 to 3, inclusive, in which it performs no function, but merely rises and falls with the movement of the lever to its operative position, in which it acts upon the pawls to produce the step-by-step lowering, we provide a swinging latch 30, which is pivoted to the frame, as shown, and which when thrown from the position shown in Figs. 1 to 3 to that shown in Figs. 4 and 5 allows the slide to drop to a position where it acts upon the pawls. In this latter position the lever is depressed from the position shown in full lines in Fig. 1 to that shown in full lines in Fig. 4. The tripping-slide 24 is thus moved upwardly and engages a projection 31 on the pawl 11, and the inclined upper face of the projection 29 disengages the pawl 11 from the teeth 8 and holds the pawl in disengaged position after the projection has been brought into the position shown in full lines in Fig. 4. A notch 32 is formed on the outer face of the projection 31 to receive the projection 29 on the slide. The upward movement of the lever to the position shown in dotted lines in Fig. 4 permits the frame 12 to be lowered one notch, the pawl 11 being held out of engagement with the teeth 8 during this downward movement until the projection 29 is disengaged from the projection 31 on the pawl 11, when the weighted U-shaped lever 21 will drop and bring the pawl 11 into engagement with the next tooth below. The projection 28 on the tripping-slide then rests upon a projection 33 on the lever-pawl 9. The lever carrying the pawl 9 being moved upwardly from the dotted position shown in Fig. 4 to the full-line position shown in Fig. 5 disengages the pawl 9 from the teeth 7 and permits the projection 28 to fall in front of the projection 33 and the projection 29 to rest upon the latch 30. When the parts are in this position, the pawl 9 is held disengaged during the movement from the position shown in full lines in Fig. 5 to that shown in dotted lines, so that the pawl will engage the next tooth below the one which it previously engaged as soon as the projection 33, carried by the pawl, passes below the lower edge of the projection 28 on the tripping-slide. The weighted arm 20 of the pawl, acting by gravity as soon as the pawl 9 is free to move inwardly, causes it to engage the tooth 7, the parts then being in the position shown in Fig. 1, the latch 30 being in the position shown in dotted lines. The parts are thus brought to the position for the next lowering movement, when the cycle of operations just described is repeated. To lower the jack by disengaging the pawls, the U-shaped lever 21 is lifted and the pawl 9 is thrown back and engaged with it, as in the prior Aiken patents, the entire frame then dopping to the bottom of the toothed bar.

The advantages of our invention result from the use of the tripping-slide, which when in operative position acts upon the pawls to cause the lowering movement and which may be set in either position by means of the latch, and, further, from the securing device for holding the jacks in different angular positions.

Many changes may be made in the form and arrangement of the different parts without departing from our invention, since we consider ourselves the first to use the tripping device which acts upon pawls engaging teeth on opposite sides of the toothed bar in a jack of the general character described.

We claim—

1. A jack having a bar provided with teeth on both sides, a traveling frame having a pawl engaging the teeth on one side of the bar, a pawl pivoted in the frame, and engaging the teeth on the opposite side of the bar, and a tripping device arranged to act upon said pawls in the step-by-step lowering of the frame; substantially as described.

2. In a lifting-jack, a vertical bar having teeth on both sides, a traveling frame having a pawl engaging the teeth on one side of the bar, a lever pivoted in the frame and carrying a pivoted pawl engaging the teeth on the opposite side, and a vertically-sliding tripping-plate having projections arranged to engage the pawls in the step-by-step lowering of the frame; substantially as described.

3. In a lifting-jack, a double-toothed bar, a traveling frame having a pivoted pawl engaging the teeth on one side of the bar, a lever pivoted in the frame, and carrying a pivoted pawl engaging the teeth on the opposite side of the bar, means for yieldingly pressing the pawls into engagement with the teeth, a vertically-movable tripping-plate arranged to act upon the pawls, and a latch device arranged to hold the tripping-plate in either operative or inoperative position; substantially as described.

4. A lifting-jack having a double-toothed bar, a frame arranged to travel longitudinally of the bar, and having a pivoted pawl engaging one set of teeth of the bar, a lever pivoted to the frame, and carrying a pivoted pawl engaging the teeth on the opposite side, a vertical slide having projections arranged to engage the pawls, a projection on the lever arranged to act upon the vertical slide, and a latch device arranged to hold the slide in either operative or inoperative position; substantially as described.

5. A lifting-jack having a double-toothed bar, and a frame arranged to travel thereon, said bar being pivoted to a base, and mechanism for locking the bar in either vertical or angular position; substantially as described.

In testimony whereof we have hereunto set our hands.

JOHN W. GARLAND.
ALBION P. AIKEN.

Witnesses:
F. C. HODKINSON,
C. A. GLASER.